United States Patent
Deri et al.

(10) Patent No.: US 6,419,404 B1
(45) Date of Patent: Jul. 16, 2002

(54) COMPACT MULTIWAVELENGTH TRANSMITTER MODULE FOR MULTIMODE FIBER OPTIC RIBBON CABLE

(75) Inventors: Robert J. Deri, Pleasanton; Michael D. Pocha, Livermore; Michael C. Larson, Goleta; Henry E. Garrett, Livermore, all of CA (US)

(73) Assignee: The Regents of the University of California, Oakland, CA (US)

( * ) Notice: Subject to any disclaimer, the term of this patent is extended or adjusted under 35 U.S.C. 154(b) by 143 days.

(21) Appl. No.: 09/607,992

(22) Filed: Jun. 30, 2000

Related U.S. Application Data

(60) Provisional application No. 60/142,190, filed on Jul. 1, 1999.

(51) Int. Cl.[7] .................................................. G02B 6/36
(52) U.S. Cl. .............................. 385/89; 385/39; 385/49; 385/91
(58) Field of Search .............................. 385/89, 88–91, 385/39.52, 47

(56) References Cited

U.S. PATENT DOCUMENTS 5,544,268 A * 8/1996 Bischel et al. ................ 385/16
6,049,641 A * 4/2000 Deacon et al. ................ 385/15
6,132,107 A * 10/2000 Morikawa ..................... 257/432
6,320,996 B1 * 11/2001 Scobey et al. ............... 359/128

OTHER PUBLICATIONS

S. Hu et al., IEEE Journal of Quantum Electronics, vol. 34, No. 8, Aug. 1998, pp. 1403–1414.

* cited by examiner

Primary Examiner—Ellen E. Kim
(74) Attorney, Agent, or Firm—L. E. Carnahan; Alan H. Thompson

(57) ABSTRACT

A compact multiwavelength transmitter module for multimode fiber optic ribbon cable, which couples light from an M×N array of emitters onto N fibers, where the M wavelength may be distributed across two or more vertical-cavity surface-emitting laser (VCSEL) chips, and combining emitters and multiplexer into a compact package that is compatible with placement on a printed circuit board. A key feature is bringing together two emitter arrays fabricated on different substrates—each array designed for a different wavelength—into close physical proximity. Another key feature is to compactly and efficiently combine the light from two or more clusters of optical emitters, each in a different wavelength band, into a fiber ribbon.

18 Claims, 5 Drawing Sheets

COMPACT MULTIWAVELENGTH TRANSMITTER MODULE FOR MULTIMODE FIBER OPTIC RIBBON CABLE

RELATED APPLICATION

This application relates to U.S. Provisional Application No. 60/142,190 filed Jul. 1, 1999, and claims priority thereof.

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to parallel optical interconnects using multimode fiber, particularly to wavelength division multiplexing (WDM) parallel optical fiber interconnects, and more particularly to a compact multiwavelength transmitter module for multimode parallel optical fiber ribbon cable.

Massively-parallel distributed computing systems, as well as the growth of multimedia and the Internet, are limited by ever-increasing data transmission capacity requirements. In these applications the in/out (I/O) bottleneck is particularly severe as the number of nodes in the network is scaled upwards. Optical fiber is clearly superior to electronic switching and cabling in terms of bandwidth, cross-talk, and interconnection fan-out. However, the inherent fiber bandwidth is vastly underutilized because of limits on the modulation rate of the laser diode transmitter used to convert the data stream from the electronic to the photonic domain.

Wavelength division multiplexing (WDM) is a means of encoding information in parallel onto multiple transmission wavelengths transmitted within a single optical fiber to better utilize this bandwidth. Another technique for enhancing bandwidth is simply to parallelize the physical transmission medium itself by forming the transmission link using multiple fibers, each fiber carrying a different "bit" in parallel. This is most cost effective for short-distance (<100 m) links, such as those between multiple compute boxes in a distributed computing cluster or between a compute box and disk array, where the cost of the fiber is low compared to the transmitter or receiver modules. Key to achieving component cost reduction is the use of multi-mode fiber, which uses a fiber core diameter approximately 10 times larger than the single mode fiber used in long-distance telecom applications; the larger size greatly eases the cost of alignment and packaging. The ultimate in performance at low cost will be achieved by combining WDM with parallel multimode optical fiber links, achieving an M×N fold improvement in bandwidth given M wavelengths and N fibers, while keeping cost in line by choosing an appropriate packaging architecture. Single wavelength systems using 12-wide fiber cable are commercially available from several sources, including Siemens in Germany, Optobahn and Vixel Corp. in the USA.

A parallel fiber multi-wavelength optical transmitter module is a necessary element in such a WDM system. Practically, this transmitter requires an M×N array of emitters which can each be independently modulated. An important enabling technology is the vertical-cavity surface-emitting Laser (VCSEL). A VCSEL is a semiconductor laser diode which emits light perpendicular to the plane of the substrate on which it is fabricated and consists of an active layer residing within an optical cavity sandwiched by two distributed mirrors. Because of this vertical orientation, two-dimensional VCSEL arrays are easily fabricated. Furthermore, the emission wavelength is controlled by the cavity layer thickness and is thus an easily-controlled design parameter. However, the number of different wavelength channels achievable monolithically on a single substrate may be limited (ranging from 1 to 4 or 8).

Single chip (monolithic) approaches don't provide sufficient wavelength range and can furthermore lead to problems with crosstalk. Such a single chip approach is exemplified by S. Hu et al., "Multimode WDM Optical Data Links With Monolithically Integrated Multiple-Channel VCSEL and Photodetector Arrays," IEEE Journal of Quantum Electronics, Vol. 34, No. 8, pp. 1403–1414, August 1998, which described a method of coupling the light of multiple emitters into a single multi-mode fiber, each emitter lasing at a different wavelength, by fabricating the emitters in close physical proximity on the same semiconductor substrate.

The present invention involves a multiwavelength transmitter module suitable for multimode parallel optical fiber ribbon cable. A key feature of the invention is to compactly and efficiently combine the light from two or more clusters of optical emitters, each in a different wavelength, into a fiber ribbon. Another key feature of the invention is bringing together two emitter arrays fabricated on different substrates—each array designed for a different wavelength—into close proximity.

SUMMARY OF THE INVENTION

It is an object of the present invention to provide a multi-wavelength transmitter module suitable for multimode parallel optical fiber ribbon cable.

A further object of the invention is to extend the bandwidth of transmitters using single wavelength systems by using wavelength division multiplexing (WDM).

Another object of the invention is to provide a compact multiwavelength transmitter module for multimode fiber optic ribbon cable.

Another object of the invention is to provide a means for coupling light from an M×N array of emitters onto N fibers, where the M wavelengths may be distributed across two or more VCSEL chips, and combining multiplexers into a compact package.

Another object of the invention is to compactly and efficiently combine the light from two or more clusters of optical emitters into an optical fiber ribbon, with each being in a different wavelength band.

Another object of the invention involves bringing together two emitter arrays fabricated on different substrates into close physical proximity, each array having a different wavelength.

Another object of the invention is to provide a multiwavelength transmitter for multimode fiber optics with sufficient wavelength range and which prevents crosstalk.

The objects and advantages of the present invention will become apparent from the following description and accompanying drawings. Basically, the invention provides a compact multiwavelength transmitter module for multimode fiber optic ribbon cable, using wavelength division multiplexing (WDM). The multiwavelength transmitter of the invention includes five (5) novel features: 1) two-wavelength transmitter subunits, 2) connecting of the subunits with mechanically transferable (MT) ferules/guide pins, 3) fiber superstrate array containing wavelength-selective turning mirror/filters, 4) attaching VCSEL die to a silicon optical bench, and 5) combining the hybrid approach to transmitter integration with monolithic techniques which achieve multiple wavelengths on the same chip. Items 1–4 above can produce 2, 4, 6, 8, etc. wavelengths in a compact format (e.g., pin grid array package of ~1 square inch array and 0.5 inch height). Additional improvements in number-of-wavelengths or compactness can be achieved using item 5 above.

BRIEF DESCRIPTION OF THE DRAWINGS

The accompanying drawings, which are incorporated into and form a part of the disclosure, illustrate embodiments of the invention and, together with the description, serve to explain the principles of the invention.

FIG. 6 shows fiber-coupled output power.

DETAILED DESCRIPTION OF THE INVENTION

The present invention provides a means for realizing a low-cost multiwavelength optical transmitter module coupled to a multimode optical fiber array (parallel optical interconnect or POI). As pointed out above, POIs using multimode fiber (MMF) ribbon cable is an emerging technology for robust, high-performance data links. Wavelength division multiplexing (WDM) over fiber ribbon is a promising technique to increase transmission bandwidth as well as enabling more complex wavelength-routed interconnection architectures, with particular applications in high-performance computing. A necessary component for such links is the multiwavelength transmitter, which emits on multiple wavelength channels across multiple fibers. Owing to the ease of fabrication of vertical-cavity surface emitting lasers (VCSELs) in one- and two-dimensional arrays, VCSELs are a natural candidate for parallel fiber sources, and the challenge is to multiplex in parallel a large number of wavelength channels at robust channel spacing ($\Delta\lambda$~10 nm) in a compact and efficient fashion. This has been accomplished by the present invention by employing a combination of direct fiber coupling and broadband add/drop filtering to demonstrate a 4-wavelength by 10-fiber VCSEL-based transmitter in a pin grid array (PGA) package with multiwavelength transmitter (MT)-connectorized output.

Figure 1:
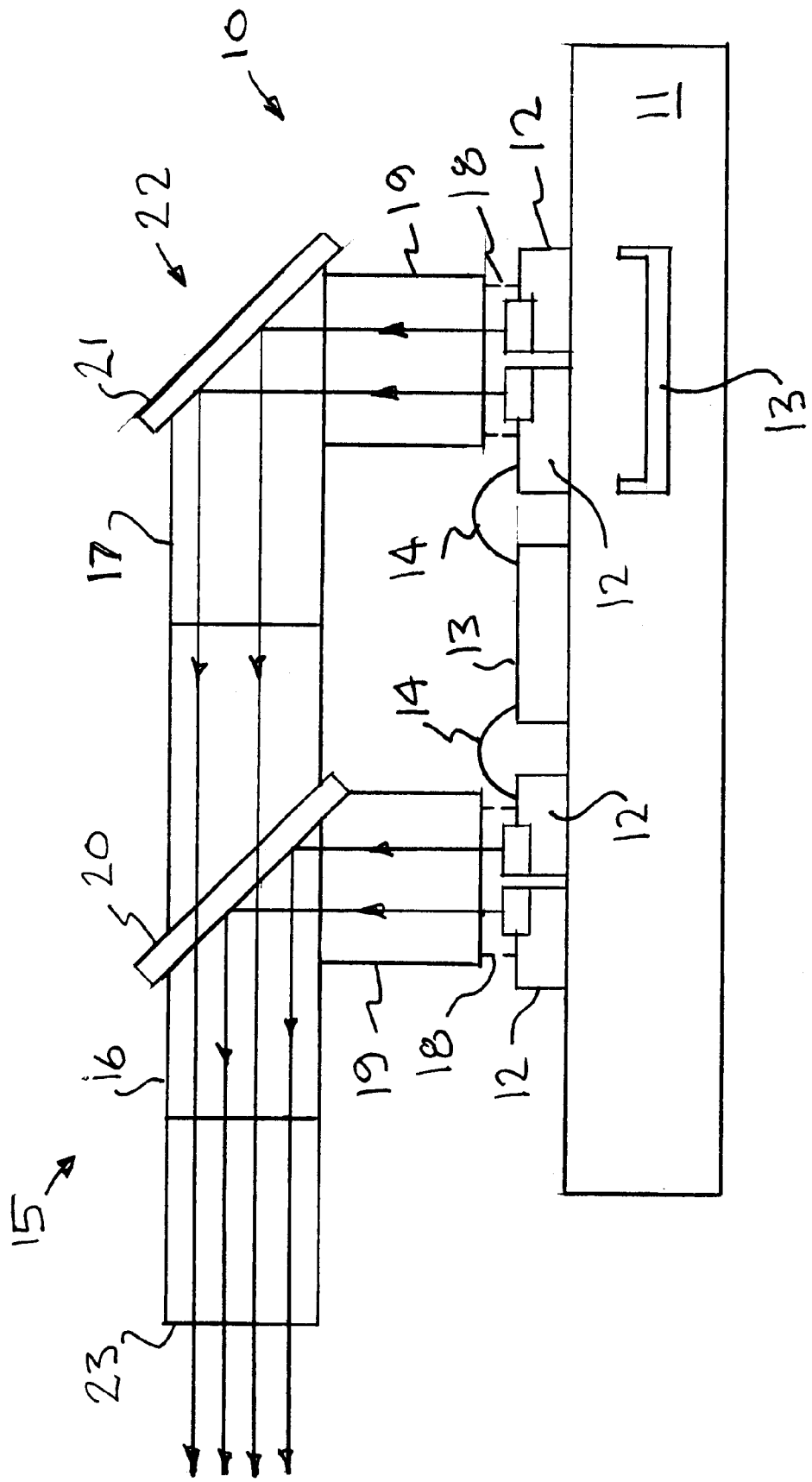
FIG. 1 illustrates an embodiment of a multiwavelength optical transmitter module coupled to a multimode optical fiber array in accordance with the present invention.

FIG. 1 illustrates an embodiment of the 4-wavelength parallel fiber transmitter, described in detail hereinafter with a detailed description of FIGS. 2 and 3. Basically, FIG. 1 consists of four single-wavelength VCSEL arrays, emitting near 825, 845, 977, or 988 nm, fastened to a silicon optical bench submount. VCSEL chips are cleaved such that the ~8 $\mu$m diameter emitter active area is centered within 15 $\mu$m of the chip edge, so that two arrays can be placed back-to-back to directly couple to the 62.5 $\mu$m core diameter of fiber ribbon. In this way, two 2-wavelength outputs are emitted near 830 nm and 980 nm. These two bands are multiplexed using a T-shaped fiber-guided add/drop filter, which is a parallel-fiber three-port device consisting of an AlGaAs/AlAs Bragg mirror embedded at 45 degrees within a fiber ribbon rigidly encased in an MT ferule. Vertical emission at the 830 nm band is reflected horizontally by the Bragg mirror, combining it with 980 nm band light propagating in the horizontal direction. A (non-multiplexing) gold turning mirror, packaged in a similar fashion to the Bragg mirror, directs the vertical 980 nm band emission to the horizontal input of the add/drop filter. Together these turning and multiplexing optics form a fiber-guided superstrate with the four-wavelength output terminated in a MT connector. The superstrate is mated to the silicon submount using guide pins and etched guide pin holes beneath which a second set of MT ferules are epoxied for mechanical stability. Finally, an electrical interconnect chip is placed on the submount to aid in wire bonding to the VCSEL electrical contacts, and the assembly is packaged within a pin grid array.

Experimental verification has been carried out utilizing the embodiment of FIG. 1, and such will be described hereinafter with respect to FIGS. 4–7.

Figure 2:
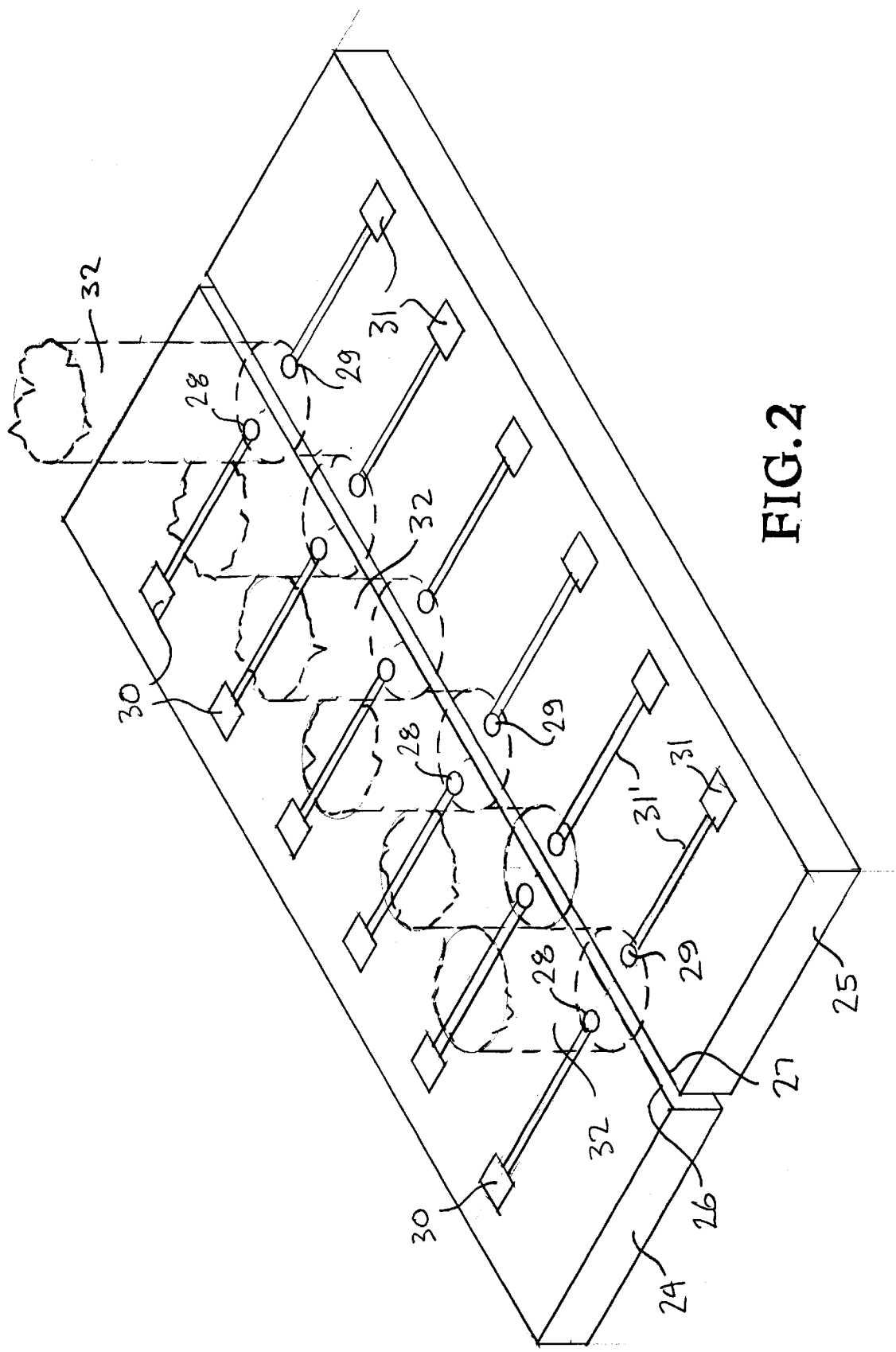
FIG. 2 illustrates a two-wavelength transmitter assembly including arrays of VCSELs fabricated on different substrates and positioned in close physical proximity.
Figure 3:
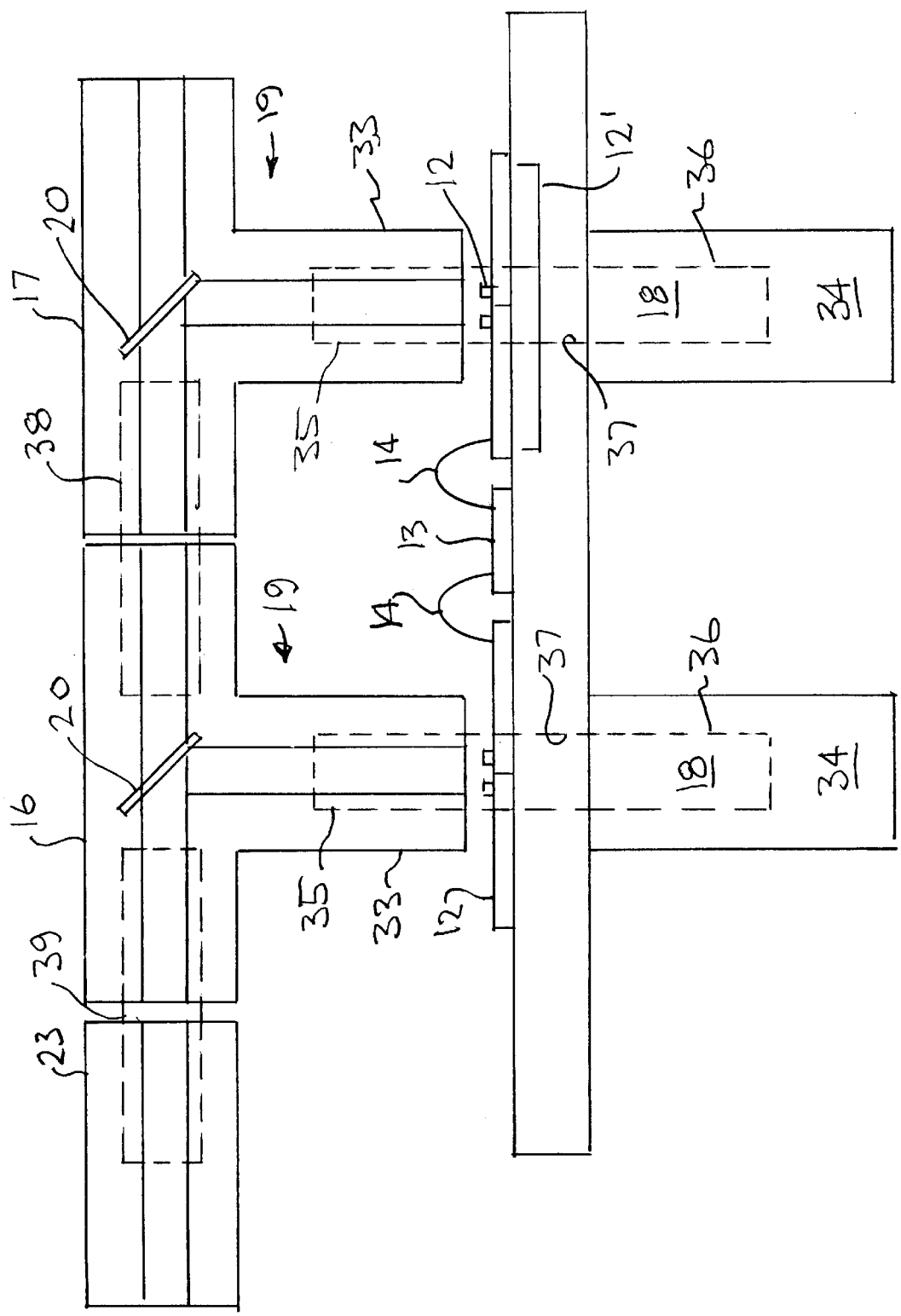
FIG. 3 illustrates modularization of the transmitter of FIG. 1 including the transmitter assemblies of FIG. 2 mounted with MT ferules/guide pins for direct connection to a fiber ribbon cable.
Figure 7:
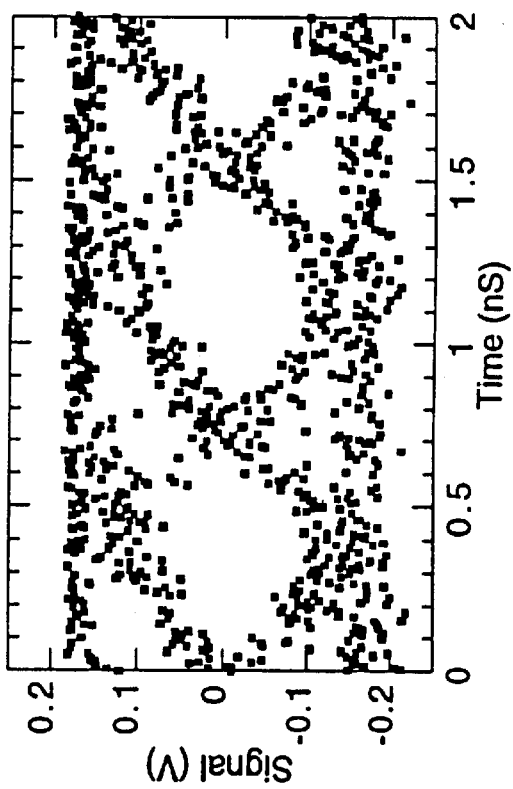
FIG. 7 is an eye diagram at 1.25 Gbit/s of a fiber at 988 nm.

Prior to a detailed description of the embodiment of FIG. 1, with components thereof being illustrated in detail in FIGS. 2 and 3, the 4-wavelength transmitter of FIG. 1 depicts a single fiber slice of a larger transmitter made of parallel fibers (stacked out of the plane of FIG. 1) and as schematically indicated in FIG. 2 by dash lines. Some of the key features, subcombinations of the overall transmitter of FIG. 1, are set forth as follows:

I. Two-wavelength transmitter subunits. An array of M single-wavelength VCSELs at $\lambda 1$ is fabricated on a substrate with a spacing appropriate for butt-coupling to an M-fiber array. The die is subsequently cleaved in close proximity (<5 $\mu$m) to one side of the array (electrical interconnect lines can run on the opposite side). A second die at $\lambda 2$ is cleaved in the same fashion. These are mounted (e.g., epoxied onto a silicon optical bench) so that the two cleaved edges are butted up against each other and aligned such that each emitter of die1 is adjacent to a second emitter in die2. By keeping the center-to-center distance small between emitters on the two chips, both can be efficiently coupled into the same multimode fiber. Likewise, if each of the two die contain multiple wavelength VCSEL arrays arranged in densely-packed pixels (e.g., 2×M or 4×M), then this method will effectively double or quadruple the number of wavelengths directly coupled into the fiber ribbon.

II. Connecterization of 2$\lambda$ subunits with MT ferules/guide pins so that in principle they can be directly connected to fiber ribbon cable with minimal losses.

III. Fiber superstrate array containing wavelength-selective turning mirror/filters. This subinvention consists of T-shaped submodules which act as add/drop multiplexors. Each submodule collects light emitted vertically from a cluster of multi-wavelength VCSELs arrays with wavelengths in a band $\lambda 1 \ldots \lambda 2$ and multiplexes that light onto a horizontal fiber array. This fiber superstrate submodule allows horizontally-propagating light outside this band to pass unimpeded from input to output. Multiplexing is achieved through an interference filter embedded at 45° to any of the three ports of the T. Submodules are cascaded to multiplex multiple wavelength bands. Alternatively, multiplexing can take place using a partially-reflective mirror (beamsplitter) rather than a wavelength selective filter, or a broadband high-reflection coating can be used if the module is the very first in the chain. Each multiplexer submodule is functionally a 3-port filter as described by Deri et al., in copending U.S. application Ser. No. 09/281,742 filed Mar. 3, 1999, and is packaged with an industry-standard MT ferule/guide pins on each port. The additional inventive aspect which leads to a compact transmitter module is the concept of: i) directly cascading submodules without the need for intervening fiber, and ii) directly mating the $3^{rd}$ port of each submodule to a 2λ×M VCSEL array subunit described in bullets I and II. In both cases, passive alignment of submodule-to-submodule and submodule-to-emitter array is achieved through MT ferules/guide pins. Compared to a "T" less structure containing only a horizontal fiber array with embedded filters, our arrangement solves 2 additional practical problems, namely, reducing diffraction loss while providing extra clearance between the fiber superstrate and the VCSEL die to allow for wirebonding electrical contacts.

IV. Attaching VCSEL die to a silicon optical bench, possibly containing passive alignment pedestals for fast and accurate placement, as well as space for MT ferules/guide pins, interconnect chips, and/or VCSEL driver chips. Active alignment/placement/attachment of MT ferules (and thus the superstrate) to the optical bench can be assisted through the use of a squared alignment fixture as well as microscope alignment with temporarily-placed thinned ferules.

V. Combine the hybrid approach to transmitter integration (parts I–IV above using single-wavelength VCSEL chips) with monolithic techniques which achieve multiple wavelengths on the same chip.

In principle, parts I–IV describe a method which can produce 2, 4, 6, 8, etc. wavelengths in a compact format (e.g., pin grid array package of ~1 square inch array and 0.5" height). Additional improvements in number-of-wavelengths or compactness can be achieved using part V.

Referring now to the drawings, the compact multiwavelength transmitter module of FIG. 1, generally indicated at 10, comprises a silicon submount or optical bench 11 on which is mounted four (4) VCSEL die arrays 12 and an interconnect chip 13 with interconnect wires 14. The VCSEL die 12 are constructed to form 2-die subunits 12', as shown in detail in FIG. 2. Located above submount 11 is an optical fiber assembly 15 composed of two T-shaped sections 16 and 17 which are supported via guide pins 18 and ferule blocks 19 shown in detail in FIG. 3. Each of T-shaped sections 16 and 17 include a multiplexing add/drop filter 20 and 21, with section 17 additionally including a mirror assembly 22. T-shaped section 16 is mounted to a multi-λ output fiber array 23. The apparatus of FIG. 1 produces a multi-λ output indicated at arrow 23'.

FIG. 2 illustrates two of the four VCSEL arrays 12 of FIG. 1, and each pair of die or chips 12 indicated in FIG. 2 as λ1 VCSEL die 24 and λ2 VCSEL die 25 include cleaved edges 26 and 27, and are placed in back-to-back relation so that the cleaved edges are butted up against each other and aligned such that each VCSEL emitter 28 of the λ1 VCSEL die array 24 is adjacent to an emitter 29 of the λ2 VCSEL die array 25, as seen in FIG. 2. Each emitter 28 of array 24 is connected to a wire bond pad 30 and each emitter 29 of array 25 is connected to a wire bond pad 31 via interconnect metal 31', with pads 30 and 31 being connected via wires 14 of FIG. 1 to interconnect chip 13. As pointed out above, by keeping the center-to-center distance small between pairs of emitters 28 and 29, both can be efficiently coupled into the same multimode fiber as indicated by the parallel multimode fibers 32, shown in dotted lines, in FIG. 2.

The multimode optical fiber assembly of FIG. 1 is mounted on the silicon optical bench or submount using connector ferules and passive alignment as exemplified in FIG. 3. As seen in FIG. 3, the optical fiber sections 16 and 17 include T-shaped ferule blocks 19 with guide pins 18. Each of the ferule blocks 19 include a section 33 mounted to fiber sections 16 and 17 and a section 34 mounted beneath silicon optical bench 11, with guide pins 18 extending into opening 35 and 36 is ferule block sections 33 and 34 and extending through openings 37 in silicon optical bench 11. Optical fiber sections 16 and 17 are interconnected by a guide pin 38 and optical fiber section 16 is mounted to multi-λ output fiber array 23 by a guide pin 39.

As pointed out above, experimental demonstrations were carried out with the MT-connectorized 4-wavelength by 10-fiber VCSEL-based transmitter for coarse wave-length-division multiplexing over multimode parallel optical fiber ribbon cable using the transmitter of FIGS. 1–3.

Figure 4:
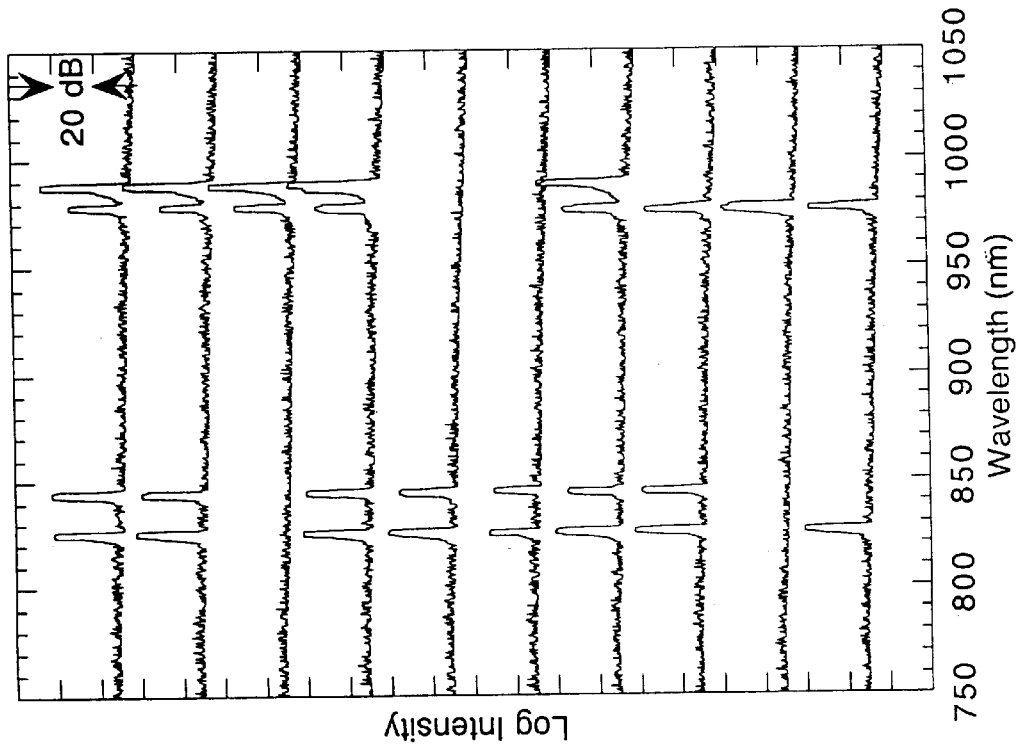
FIG. 4 illustrates the output spectra for each of ten fibers with VCSELs mounted as in FIG. 2, and simultaneously biased at 3 mA each.
Figure 5:
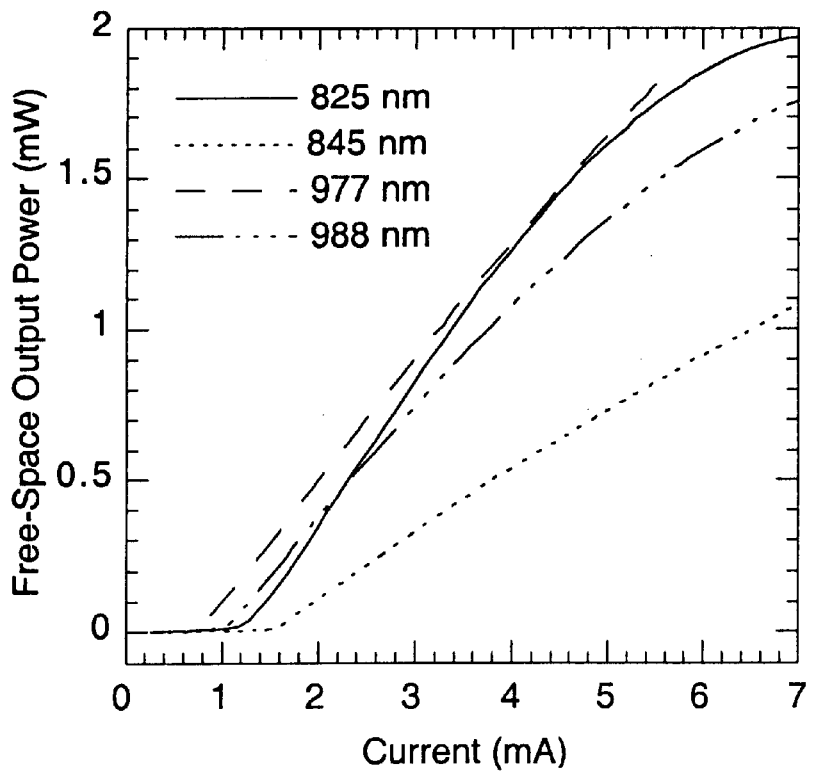
FIGS. 5 and 6 graphically illustrate light vs. current characteristics for a fiber channel, with FIG. 5 showing output power into free space.
Figure 6:
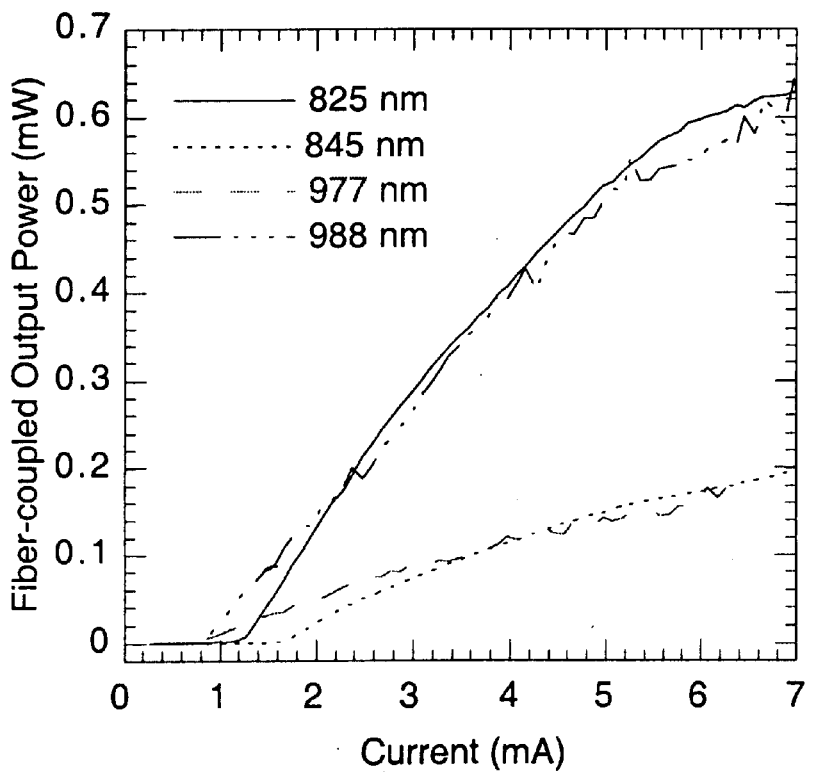

Spectra for each of the ten output fibers of the fiber ribbon are plotted on a logarithmic scale in FIG. 4. VCSELs at all four wavelengths were simultaneously biased at 3 mA, and light from the ribbon cable was directed through a break-out connector and collected by an optical spectrum analyzer. Due to wire bonding difficulties, not all wavelengths were achieved for all fibers. FIGS. 5 and 6 show the output power vs. injection current for the four emitters comprising channel (fiber) #7, showing both the total power emitted into free space without the multiplexer present as well as fiber-coupled power. Coupled power as high as −2 dBm is achieved; the lower than expected power for the 977 nm emitter is likely due to misalignment. Finally, an eye diagram showing digital modulation at 1.25 Gbit/s under a $2_{23}$-1 pseudorandom bit stream (fiber #3, 988 nm) is plotted in FIG. 7; error rates of $<10^{-14}$ were achieved. Further characterization is underway, including crosstalk between fibers as well as between wavelength channels within a fiber.

This is the first demonstration to our knowledge of a multiwavelength VCSEL-based parallel optical fiber transmitter. Such a device is useful for future high-bandwidth low-cost data communications applications. The use of a hybrid packaging scheme employing a fiber-ribbon-guided add/drop filter enables ten fibers by four wavelengths with a wide (>10 nm) channel spacing; more wavelengths should be achievable either by using additional filters and/or by combining this approach with monolithic techniques of achieving multiple wavelengths per VCSEL die.

The invention will find general use as an optical source for high-capacity communications systems which demand the additional performance afforded by transmitting information using wavelength division multiplexing (whereby the effective bandwidth is multiplied by a factor M, the number of wavelengths) on multimode parallel optical fiber ribbon cable (whereby this effective bandwidth is multiplied by an additional factor N, the number of fibers in the cable, which is typically ten or more). Particular systems of interest to LLNL include the interconnects of computing nodes within massively parallel computing clusters, within embedded systems for DOD or intelligence applications, and the local area network between such processing systems and user workstations and/or archival storage. The invention also provides a means to enhance the bandwidth of byte-wide (or word-wide) interconnects within commercial multiprocessor computing systems, without having to upgrade the physical transmission media. Also useful for future high-speed computer networks (e.g., 10-gigabyte ethernet, two steps beyond the next-generation gigabit ethernet).

While a particular embodiment of the invention along with parameters, etc., have been described and/or illustrated to exemplify and teach the principles of the invention, such are not intended to be limiting. Modifications and changes may become apparent to those skilled in the art, and it is intended that the invention be limited only by the scope of the appended claims.

What is claimed is:

1. A multiwavelength transmitter module for multimode fiber optic ribbon cable, comprising:
   an optical bench
   a plurality of arrays of VCSEL die mounted to said optical bench,
   a multimode parallel optical fiber assembly mounted to said optical bench,
   means for mounting said optical fiber to said optical bench,
   at least one multiplexing filter mounted to said optical fiber assembly, and
   a mirror mount to said optical fiber assembly.

2. The transmitter module of claim 1, wherein said plurality of arrays of VCSEL die include at least one two-wavelength subunit.

3. The transmitter module of claim 2, wherein said two-wavelength subunit comprises:
   a $\lambda 1$ VCSEL die,
   a $\lambda 2$ VCSEL die,
   each die having a cleaved edge,
   said dies being positioned so that the cleaved edges are butted up against each other,
   said dies each including an array of emitters,
   said dies being aligned such that an emitter of one die is adjacent an emitter of the other die, and
   a plurality of wire bond pads on each die, each pad being connected to one of said emitters.

4. The transmitter module of claim 1, wherein said means for mounting said optical fiber assembly to said optical bench comprises at least one ferule block and at least one guide pin.

5. The transmitter module of claim 4, wherein said ferule block is mounted to said optical fiber assembly to form a T-shaped configuration.

6. The transmitter module of claim 5, wherein said ferule block includes a first section mounted to said optical fiber assembly, and a second section mounted to said optical bench, said sections being interconnected by a guide pin.

7. The transmitter module of claim 6, wherein said ferule block sections are located on opposite sides of said optical bench, and wherein said guide pin extends through said bench.

8. The transmitter module of claim 4, wherein said ferule block is constructed such that embedded fibers thereof extend around at least one pair of emitters of a pair of adjacent VCSEL die.

9. The transmitter module of claim 4, wherein said optical assembly comprises a plurality of sections interconnected by guide pins, each section including a multiplexing filter mounted adjacent an end of said ferule block and in alignment with at least one pair of emitter of a pair of adjacent VCSEL die.

10. The transmitter module of claim 1, additionally including a driver die mounted to said optical bench and electrically connected to said plurality of arrays of VCSEL die.

11. The transmitter module of claim 1, wherein said optical bench is composed of silicon.

12. The transmitter module of claim 1, wherein said at least one multiplexing filter comprises an add/drop filter.

13. The transmitter module of claim 1, wherein said mirrors comprises a Bragg mirror positioned at 45 degrees with respect to said optical filter.

14. The transmitter module of claim 1, wherein said at least one multipelxing filter comprises a three port filter mounted at 45 degrees with respect to said optical fiber.

15. A multiwavelength transmitter module suitable for multimode parallel optical fiber ribbon cable, comprising:
   a silicon optical bench,
   a multimode parallel optical fiber mounted to said optical bench via a hollow ferule positioned to form a T-shaped interconnection,
   a multiplexing filter mounted in said optical fiber at said T-shaped interconnection and at a 45° angle, and
   a pair of adjacent VCSEL die positioned on said optical bench and aligned with said hollow ferule and multiplexing filter,
   said pair of adjacent VCSEL die having closely adjacent pair emitters for each parallel fiber of said multimode parallel optical fiber.

16. The transmitter module of claim 15, additionally including a mirror mounted at one end of said multimode parallel optical fiber and at a 45° angle with respect thereto.

17. The transmitter module of claim 15, wherein said optical fiber is composed of a plurality of sections, each section being mounted to said optical bench by a hollow ferule, each section including a multiplexing filter mounted at the T-shaped interconnection, and filter of each section being mounted in alignment with a pair of adjacent VCSEL die mount to said optical bench.

18. The transmitter module of claim 17, additionally including an electrical interconnect die for each pair of adjacent VCSEL die.

* * * * *